United States Patent
Wässingbo

(10) Patent No.: US 10,172,088 B2
(45) Date of Patent: Jan. 1, 2019

(54) ELECTRONIC DEVICE AND METHOD FOR CONTROLLING THE ELECTRONIC DEVICE

(71) Applicant: Sony Mobile Communications Inc., Tokyo (JP)

(72) Inventor: Tomas Wässingbo, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 304 days.

(21) Appl. No.: 15/331,935

(22) Filed: Oct. 24, 2016

(65) Prior Publication Data
US 2017/0181092 A1 Jun. 22, 2017

(30) Foreign Application Priority Data
Dec. 17, 2015 (EP) .................................. 15200629

(51) Int. Cl.
*H04W 52/02* (2009.01)
*H04W 76/23* (2018.01)
(Continued)

(52) U.S. Cl.
CPC ......... *H04W 52/0251* (2013.01); *H04W 4/80* (2018.02); *H04W 76/23* (2018.02);
(Continued)

(58) Field of Classification Search
CPC ...................................................... H04L 12/28
(Continued)

(56) References Cited

U.S. PATENT DOCUMENTS

| 2007/0004436 A1* | 1/2007 | Stirbu ................. H04L 63/0281 455/503 |
| 2008/0031208 A1 | 2/2008 | Abhishek |
| 2013/0324114 A1 | 12/2013 | Raghothaman |

OTHER PUBLICATIONS

European Search Report from corresponding European Application No. 15200629.2, dated Feb. 17, 2016.

* cited by examiner

*Primary Examiner* — Dang T Ton
(74) *Attorney, Agent, or Firm* — Tucker Ellis LLP

(57) ABSTRACT

The present invention relates to an electronic device (10) comprising: a controller (12) configured to periodically activate the electronic device from a low power mode into a proximity area connectivity mode, while in the proximity area connectivity mode, the controller is configured to control proximity area connectivity of the electronic device with one or more proximity area electronic devices (20), via a wireless proximity area connection unit (14) of the electronic device trying to establish proximity area connection (15) with the one or more proximity area electronic devices, upon successful establishment of proximity area connection of the electronic device with a predetermined set of the one or more proximity area electronic devices, the controller is arranged to return the electronic device to the low power mode; upon unsuccessful establishment of proximity area connection of the electronic device with the predetermined set of the one or more proximity area electronic devices, the controller is arranged to transfer the electronic device from the proximity area connectivity mode into a wide area connectivity mode, while in the wide area connectivity mode, the controller is configured to, via a wireless wide area connection unit (16) of the electronic device, connect the electronic device to at least one wide area electronic device (30) via a wide area connection (35).

15 Claims, 4 Drawing Sheets

(51) Int. Cl.
*H04W 4/80* (2018.01)
*H04W 84/18* (2009.01)
*H04W 4/70* (2018.01)
*H04W 76/14* (2018.01)

(52) U.S. Cl.
CPC .............. *H04W 4/70* (2018.02); *H04W 76/14* (2018.02); *H04W 84/18* (2013.01); *Y02D 70/1222* (2018.01); *Y02D 70/1262* (2018.01); *Y02D 70/142* (2018.01); *Y02D 70/144* (2018.01); *Y02D 70/162* (2018.01); *Y02D 70/166* (2018.01); *Y02D 70/26* (2018.01)

(58) Field of Classification Search
USPC ........................................................ 370/328
See application file for complete search history.

ELECTRONIC DEVICE AND METHOD FOR CONTROLLING THE ELECTRONIC DEVICE

TECHNICAL FIELD

The present invention relates to control of an electronic device.

BACKGROUND

The use of electronic devices is increasing for each year. Especially the use of electronic device embedded with electronics, software, and network connectivity, which enable the electronic device to be connected to other electronic devices. The trend is pointing towards a raising increase. With increase of electronic devices increase in the demand for electrical power driving the electronic devices will also raise. Hence, there is a need for reducing the power consumption for electronic devices, especially for electronic device embedded with electronics, software, and network connectivity.

SUMMARY OF THE INVENTION

It is an object of the present invention to overcome at least some of the above problems.

According to a first aspect a method for controlling an electronic device is provided. The method comprises: periodically activating the electronic device from a low power mode into a proximity area connectivity mode, while in the proximity area connectivity mode performing the acts of: controlling proximity area connectivity of the electronic device with one or more proximity area electronic devices; upon successful establishment of proximity area connections of the electronic device with a predetermined success set of the one or more proximity area electronic devices, returning the electronic device to the low power mode; upon unsuccessful establishment of proximity area connections of the electronic device with the predetermined success set of the one or more proximity area electronic devices, transferring the electronic device from the proximity area connectivity mode into a wide area connectivity mode, while in the wide area connectivity mode, connecting, via a wide area connection, the electronic device to at least one wide area electronic device.

Accordingly, it may be controlled in a reliable and energy efficient manner that the electronic device is located within a known environment of other electronic devices. While being in a known environment of the one or more proximity area electronic devices the electronic device will know where it is. However, upon not being able to establish connection with the known environment of the one or more proximity area electronic devices the electronic device may send an alarm over a wide area network. This method and type of electronic device may e.g. be used for theft tagging products or equipment.

The method may further comprise registering, in a memory of the electronic device, proximity area electronic devices belonging to the one or more proximity area electronic devices.

The method may further comprise setting the electronic device in a set-up mode and while in the set-up mode performing the act of checking for proximity area electronic devices which the electronic device may establish a proximity area connection with; and wherein the act of registering further comprises registering the proximity area electronic devices found during the checking, as proximity area electronic devices belonging to the one or more proximity area electronic devices. This provides a simple and efficient way for getting the electronic device to learn its environment of electric devices.

The method may further comprise upon being in the proximity area connectivity mode performing the acts of: checking for new proximity area electronic devices which the electronic device may establish a proximity area connection with; and registering, in the memory of the electronic device, the new proximity area electronic devices as belonging to the one or more proximity area electronic devices. This provides a simple and efficient way for updating which electronic devices are in environment being in the proximity of the electronic device.

The method may further comprise categorizing the one or more proximity area electronic devices into one or more distinct categories.

The predetermined success set of the one or more proximity area electronic devices may be based on the categorizing.

The predetermined success set of the one or more proximity area electronic devices may be based on a number of proximity area electronic devices a proximity area connection has been established with.

The method may further comprise controlling the periodically activating of the electronic device by a clock in the electronic device.

The method may further comprise synchronizing the clock in the electronic device and clocks of the one or more proximity area electronic devices.

The wide area connection may be a wireless connection between the electronic device and the at least one wide area electronic device relayed via an interconnecting device.

The proximity area connection may be a direct wireless connection between the electronic device and a respective proximity area electronic device.

According to a second aspect an electronic device is provided. The electronic device comprises: a controller configured to periodically activate the electronic device from a low power mode into a proximity area connectivity mode, while in the proximity area connectivity mode, the controller is configured to control proximity area connectivity of the electronic device with one or more proximity area electronic devices, via a wireless proximity area connection unit of the electronic device trying to establish proximity area connection with the one or more proximity area electronic devices, upon successful establishment of proximity area connection of the electronic device with a predetermined set of the one or more proximity area electronic devices, the controller is arranged to return the electronic device to the low power mode; upon unsuccessful establishment of proximity area connection of the electronic device with the predetermined set of the one or more proximity area electronic devices, the controller is arranged to transfer the electronic device from the proximity area connectivity mode into a wide area connectivity mode, while in the wide area connectivity mode, the controller is configured to, via a wireless wide area connection unit of the electronic device, connect the electronic device to at least one wide area electronic device via a wide area connection.

The electronic device may further comprise a memory comprising a register of proximity area electronic devices belonging to the one or more proximity area electronic devices.

The electronic device may further comprise a clock, wherein the controller is arranged to control the periodically activating of the electronic device by a clock signal provided by the clock.

The above mentioned features of the method, when applicable, apply to this second aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1A:
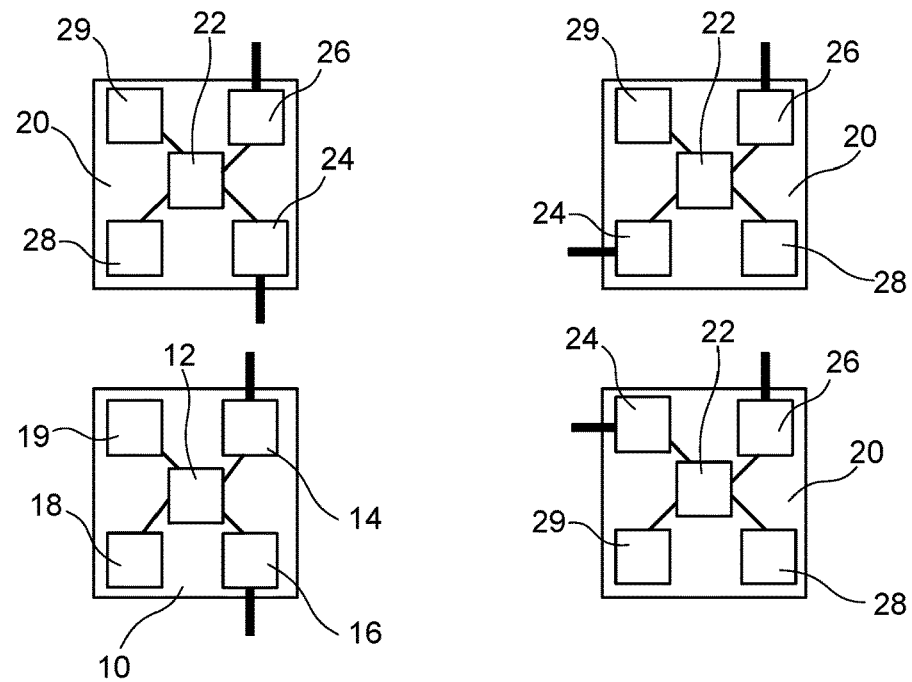
FIGS. 1A, 1B and 1C each illustrate versions of a system comprising a controllable electronic device being in different modes, within an environment of electronic devices.
Figure 1A:
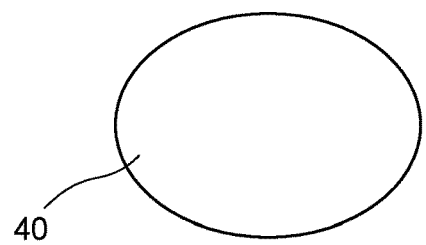
Figure 1A:
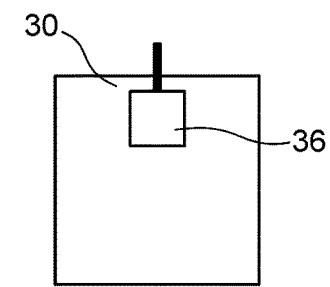
Figure 1B:
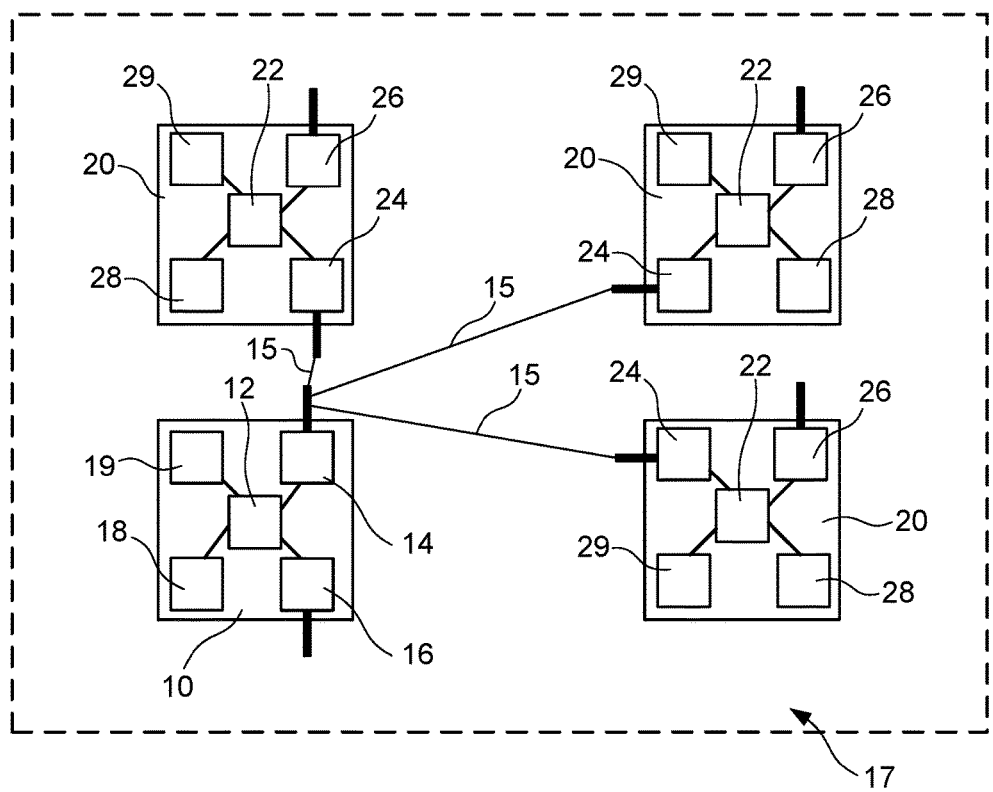
Figure 1B:
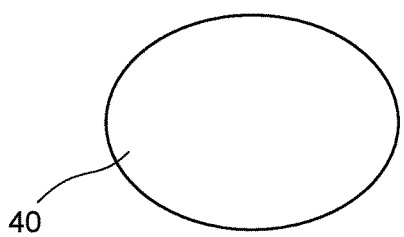
Figure 1B:
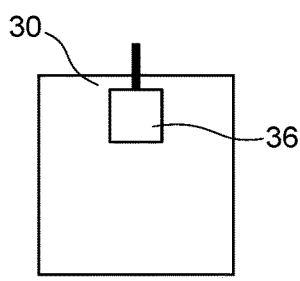
Figure 1C:
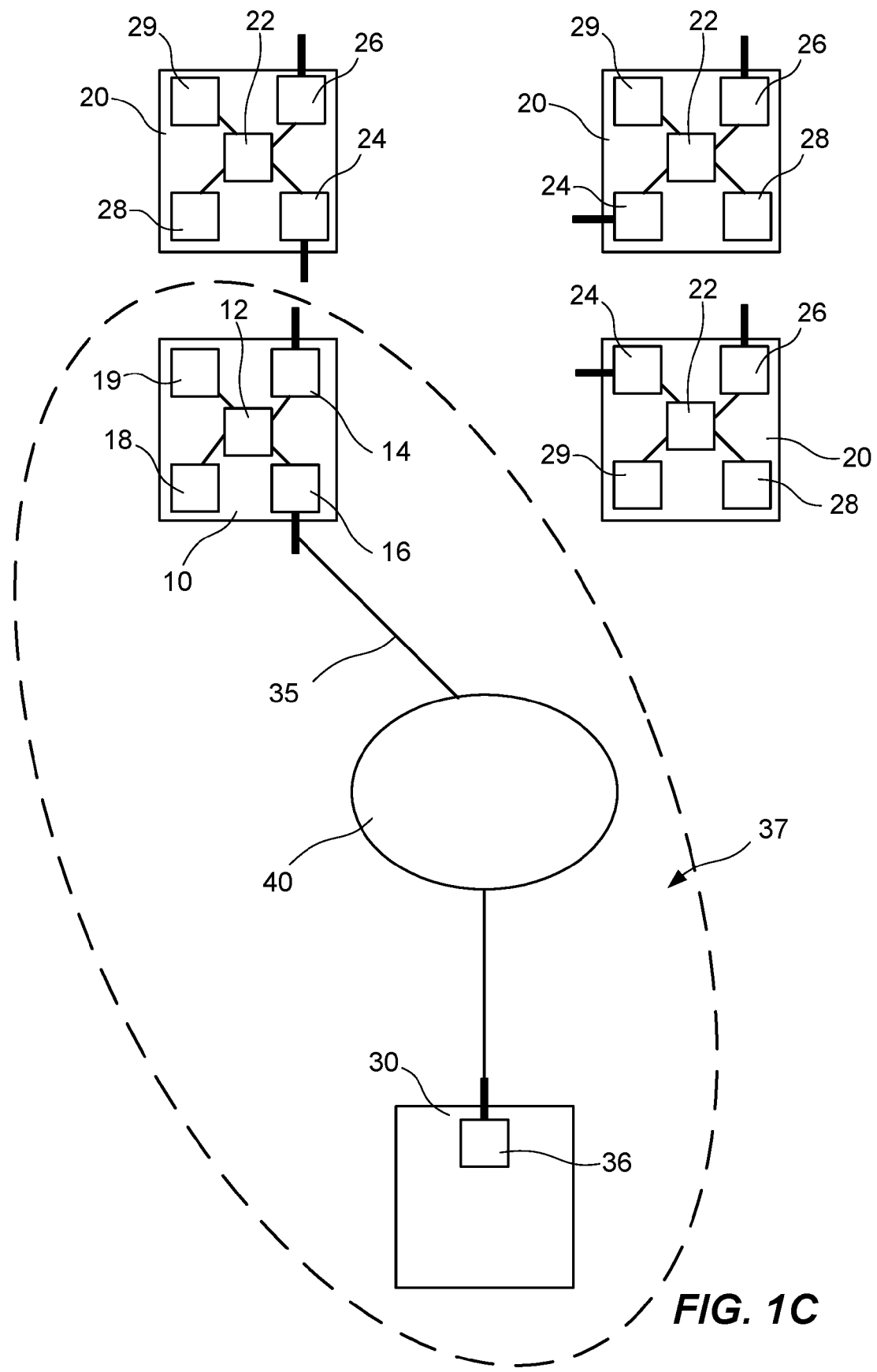

A system comprising a controllable electronic device 10 is disclosed. FIGS. 1A, 1B, 1C each illustrate the system comprising the controllable electronic device 10, wherein the electronic device 10 is set into different modes of operation. Hence, the electronic device 10 is controllable to be set in different modes. In FIG. 1A the electronic device 10 is set in a low power mode. In FIG. 1B the electronic device 10 is set in a proximity area connectivity mode. In FIG. 1B the electronic device 10 is set in a wide area connectivity mode.

The electronic device 10 is embedded with electronics, software, and network connectivity, which enable the electronic device to be connected to other electronic devices. According to a non-limiting example the electronic device 10 may be an connected to other electronic devices via Internet of Things, IoT, in order for the electronic device 10 to collect to and exchange data with other the electronic devices being embedded with electronics, software, and network connectivity.

In addition to the electronic device 10 the system comprises one or more proximity area electronic devices 20 and at least one wide area electronic device 30. The proximity area electronic device 20 is an electronic device embedded with electronics, software, and network connectivity. The wide area electronic device 30 is an electronic device embedded with electronics, software, and network connectivity.

The electronic device 10 comprises a controller 12, a wireless proximity area connection unit 14, a wireless wide area connection unit 16, a memory 18 and a clock 19.

The electronic proximity area device 20 comprises a controller 22, a wireless proximity area connection unit 24, a wireless wide area connection unit 26, a memory 28 and a clock 29. The system may comprise one proximity area electronic device 20. The system may comprise a plurality of proximity area electronic devices 20. As will be discussed more in detail below, in case of the system comprising a plurality of proximity area electronic devices 20 the proximity area electronic devices 20 may be categorized into one or more distinct categories.

The at least one wide area electronic device 30 comprises a wireless wide area connection unit 36.

The controller 12 of the electronic device 10 is configured to periodically activate the electronic device 10 from the low power mode into the proximity area connectivity mode. The period time between activation of the electric device 10 from the low power mode into the proximity area connectivity mode may be set to be minutes, hours or days. The period time between activation is determined based on the importance of that the electronic device 10 needs to be aware of its surroundings. The controller 12 of the electronic device 10 is configured to control the periodically activating of the electronic device 10 via a clock signal from the clock 19 of the electronic device 10. Further, the clock 19 of the electronic device 10 may be set to be synchronized with the clocks 29 of the one or more proximity area electronic devices 20. The synchronization may be performed when the electronic device 10 is in the proximity area connectivity mode. Alternatively or in combination, the synchronization of the clock 19, 29 in the respective electronic device 10, 20 may be performed by synchronization against a universal clock of a wide area network. For example, a wide area network in the form of the Narrowband LTE IoT comprises a universal clock. By synchronizing the clocks 19, 29 of the electronic devices 10, 20 it may be set in the respective electronic device 10, 20 when they are periodically set to establish proximity area connection with each other. The synchronizing the clocks 19, 29 of the electronic devices 10, 20 may e.g. be made once a week, once a month or even more seldom. The frequency of synchronizing depends on the exactness of the clocks 19, 29 of the electronic devices 10, 20.

The controller 12 of the electronic device 10 is further configured, while the electronic device 10 is in the proximity area connectivity mode, to control proximity area connectivity of the electronic device 10 with one or more proximity area electronic devices 20. The proximity area connectivity of the electronic device 10 with the one or more proximity area electronic devices 20 is controlled via controlling the wireless proximity area connection unit 14 of the electronic device to establish proximity area connection 15 with the respective wireless proximity area connection unit 24 of each of the one or more proximity area electronic devices. A proximity area connection is a direct wireless connection between the electronic device 10 and a respective proximity area electronic device 20. A proximity area connection may be established using various wireless network technologies, e.g. INSTEON, IrDA, Wireless USB, Bluetooth, Bluetooth Low Energy, Wireless Local Area Network (WLAN) IEEE 802.x, Radio Frequency Identification (RFID), Near Field Communication (NFC), FeliCa, ANT+, Z-Wave or ZigBee may be used. According to a non-limiting example, proximity area connections may be made by broadcasting a connection message from the electronic device 10 and listening for response messages from the one or more proximity area electronic devices 20. Alternatively or in combination, dedicated connection messages may be sent to the one or more proximity area electronic device 20.

A successful establishment of proximity area connections 15 between the electronic device 10 and a plurality of proximity area electronic devices 20 is illustrated in FIG. 1B. Upon establishment of the proximity area connections 15 a proximity area network 17 is formed. Each of the proximity area connections 15 is a direct wireless connection between two electronic devices 10, 20.

The memory 18 of the electronic device 10 comprises a register of the one or more proximity area electronic devices 20.

The one or more proximity area electronic devices 20 may be registered in the memory 10 of the electronic device 10 upon manufactory of the electronic device 10.

Alternatively or in combination, the one or more proximity area electronic devices 20 may be registered in the memory 10 of the electronic device 10 by a user of the electronic device 10.

Alternatively or in combination, the one or more proximity area electronic devices 20 may be registered in the memory 10 of the electronic device 10 during set-up of the electronic device 10. Hence, the controller 12 of the electronic device 10 may be configured to set the electronic device in a set-up mode. The electronic device 10 may be set in the set-up mode for a predetermined time lasting for everything between minutes to days. The electronic device 10 may be set in the set-up mode at first activation of the electronic device 10. The electronic device 10 may be set in the set-up mode by a user controlled action from a user of the electronic device 10. The electronic device 10 may comprise a set-up button (not shown) or other means for activating the set-up mode. In the set-up mode the controller 12 of the electronic device 10 is configured to check for proximity area electronic devices 20 the electronic device 10 may establish a proximity area connection with. The proximity area electronic devices found during such a check are then registered in the memory 18 of the electronic device 10 as the one or more proximity area electronic devices 20.

Moreover, new proximity area electronic devices 20 may be registered in the memory 10 of the electronic device 10 upon the electronic device 10 being in the proximity area connectivity mode. Hence, while being in the proximity area connectivity mode the controller 12 of the electronic device 10 is configured to check for new proximity area electronic devices which the electronic device may establish a proximity area connection with. The proximity area electronic devices found during such a check are then registered in the memory 18 of the electronic device 10 as belonging to the one or more proximity area electronic devices 20.

The registration of the proximity area electronic devices 20 in the memory 18 of the electronic device 10 may e.g. be made using a unique ID of the respective proximity area electronic device 20.

The one or more proximity area electronic devices 20 registered in the memory 18 of the electronic device 10 may be determined as belonging to one or more predetermined sets of proximity area electronic devices 20. Hence, the one or more proximity area electronic devices 20 registered in the memory 18 of the electronic device 10 may be categorized into distinct categories of proximity area electronic devices 20. Each specific proximity area electronic device 20 may belong to one or more of the distinct categories. The different predetermined sets may be set as having different priorities.

While in the proximity area connectivity mode the electronic device 10 may establish proximity area connections 15 with all, none or some of the one or more proximity area electronic devices 20. Depending on with which of the one or more proximity area electronic devices 20 proximity area connections 15 have been established the controller 12 of the electronic device 10 may be configured to control the electronic device 10 differently. The control of in which mode the controller 12 is configured to set the electronic device 10 is depending on if proximity area connections 15 with a predetermined success set of the one or more proximity area electronic devices 20 have successfully been established. The predetermined success set may be determined in different ways. One or more predetermined success sets may be stored in the memory 18 of the electronic device 10. The one or more predetermined success sets may be statically determined during the set-up mode. Alternatively, the one or more predetermined success sets may be dynamically updated upon updating the register of proximity area electronic devices 20 in the memory 18 of the electronic device 10. The predetermined success set may be based on the categorizing the one or more proximity area electronic devices into one or more distinct categories. Alternatively or in combination, the predetermined success set may be based on a number of proximity area electronic devices a proximity area connection has been established with. Non-limiting examples of the predetermined success set are: all proximity area electronic devices 20 in the register of the memory 18; all proximity area electronic devices 20 belonging to one distinct category; a predetermined ratio of the proximity area electronic devices 20 in the register of the memory 18 (e.g. 50% of the registered proximity area electronic devices 20); or one proximity area electronic devices 20 belonging to a priority category.

Upon successful establishment of proximity area connection 15 of the electronic device 10 with the predetermined success set of the one or more proximity area electronic devices 20, the controller 12 of the electronic device 10 is configured to return the electronic device to the low power mode. Hence, if the electronic device 10 detects proximity area electronic devices 20 belonging to the predetermined set of the one or more proximity area electronic devices 20 in the surrounding, it is set to return to the low power mode. The electronic device 10 is arranged to stay in the low power mode until next cycle in the periodic activation into the proximity area connectivity mode is induced.

Upon unsuccessful establishment of proximity area connection of the electronic device 10 with the predetermined set of one or more proximity area electronic devices 20, the controller 12 or the electronic device 10 is arranged to transfer the electronic device 10 from the proximity area connectivity mode into the wide area connectivity mode. In the wide area connectivity mode, the controller 12 of the electronic device 10 is configured to connect the electronic device to at least one wide area electronic device 30 via a wide area connection 35. Hence, if the electronic device 10 does not detect the predetermined set of one or more proximity area electronic devices 20 the electronic device 10 is arranged to enter a more active mode by entering the wide area connectivity mode. In the wide area connectivity mode the electronic device 10 is arranged to communicate over a wide area network to make itself visible. The wide connection is established using the wireless wide area connection unit 16 of the electronic device 10. A wide area connection 35 between the electronic device 10 and a wide area electronic device 30 is illustrated in FIG. 1C. Upon establishment of the wide area connection 35 a wide area network 37 is formed. The wide area connection is a wireless connection between the electronic device 10 and the wide area electronic device 30 relayed via an interconnecting device 40. The interconnecting device 40 may e.g. be a base station. A wide area connection may be established using various wireless network technologies, e.g. NarrowBand IoT LTE, NarrowBand IoT GSM, LPWAN or Sigfox may be used.

Figure 2:
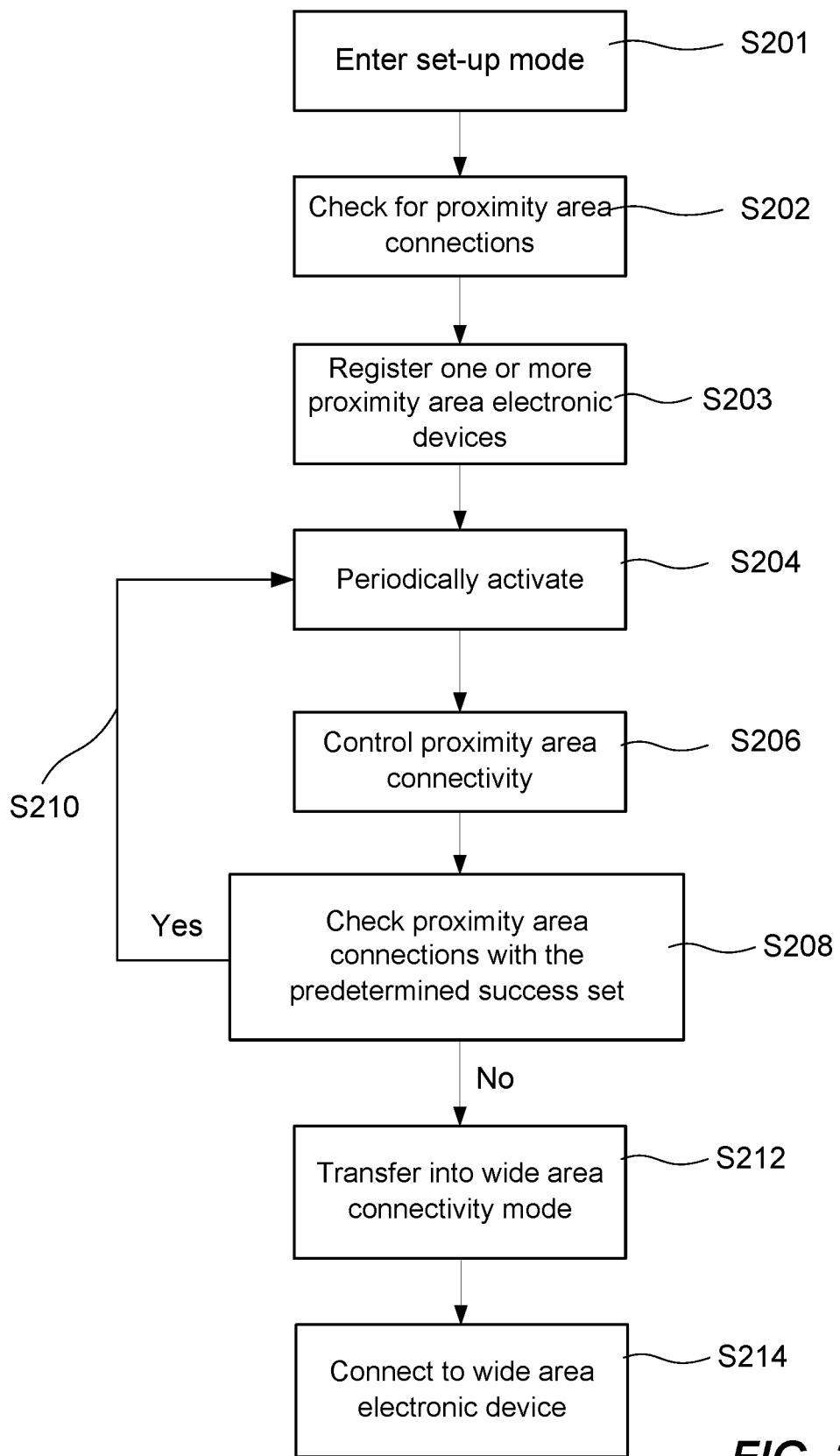
FIG. 2 is a block scheme of a method for controlling the electronic device in FIGS. 1A, 1B and 1C.

In connection with FIG. 2 a method 200 for controlling the electronic device 10 will be discussed. The method comprises: Setting S201 the electronic device 10 in a set-up mode. While in the set-up mode, checking S202 for proximity area electronic devices 20 which the electronic device 10 may establish a proximity area connection with. Registering 203, in the memory 18 of the electronic device 10, the proximity area electronic devices found during the checking S202, as proximity area electronic devices 20 belonging to the one or more proximity area electronic devices 20. Periodically activating S204 the electronic device 10 from the low power mode into the proximity area connectivity mode. While in the proximity area connectivity mode the following acts are performed: Controlling S206 proximity area connectivity of the electronic device 10 with one or more proximity area electronic devices 20. Checking S208 if proximity area connections 15 of the electronic device 10 with the predetermined success set of the one or more proximity area electronic devices 20 are established. Upon successful establishment, returning S210 the electronic device to the low power mode. Upon unsuccessful establishment, transferring S212 the electronic device 10 from the proximity area connectivity mode into the wide area connectivity mode. While in the wide area connectivity mode, connecting S214, via a wide area connection 35, the electronic device to at least one wide area electronic device 30.

Being in the proximity area connectivity mode the acts of: checking for new proximity area electronic devices which the electronic device 10 may establish a proximity area connection with; and registering, in the memory 18 of the electronic device 10, the new proximity area electronic devices 20 as belonging to the one or more proximity area electronic devices 20 may be performed.

The person skilled in the art realizes that the present invention by no means is limited to the preferred embodiments described above. On the contrary, many modifications and variations are possible within the scope of the appended claims.

For example, the electronic device 10 may be an electronic device, embedded with electronics, software, and network connectivity, which is arranged to be physically connected to valuable products or equipment.

Moreover, one of a plurality of proximity area electronic devices 20 may have a higher priority than the other ones, so that as long as the high priority proximity area electronic device is discoverable to the electronic device 10, the electronic device 10 does not have to enter wide area connectivity mode. The high priority proximity area electronic device may e.g. be a users smart phone, wristband smart watch or similar.

Furthermore, the controller 12 of the electronic device 10 may be implemented in hardware, software or a combination thereof. The clock 19 of the electronic device 10 may be implemented in hardware, software or a combination thereof.

Additionally, variations to the disclosed embodiments can be understood and effected by the skilled person in practicing the claimed invention, from a study of the drawings, the disclosure, and the appended claims.

The invention claimed is:

1. A method for controlling an electronic device, the method comprising:
   periodically activating the electronic device from a low power mode into a proximity area connectivity mode, while in the proximity area connectivity mode performing the acts of:
   controlling proximity area connectivity of the electronic device with one or more proximity area electronic devices;
   upon successful establishment of proximity area connections of the electronic device with a predetermined success set of the one or more proximity area electronic devices, returning the electronic device to the low power mode;
   upon unsuccessful establishment of proximity area connections of the electronic device with the predetermined success set of the one or more proximity area electronic devices, transferring the electronic device from the proximity area connectivity mode into a wide area connectivity mode, while in the wide area connectivity mode, connecting, via a wide area connection, the electronic device to at least one wide area electronic device.

2. The method of claim 1, further comprising registering, in a memory of the electronic device, proximity area electronic devices belonging to the one or more proximity area electronic devices.

3. The method of claim 2, further comprising setting the electronic device in a set-up mode and while in the set-up mode performing the act of checking for proximity area electronic devices which the electronic device may establish a proximity area connection with; and wherein the act of registering further comprises registering the proximity area electronic devices found during the checking, as proximity area electronic devices belonging to the one or more proximity area electronic devices.

4. The method of claim 1, further comprising upon being in the proximity area connectivity mode performing the acts of:
   checking for new proximity area electronic devices which the electronic device may establish a proximity area connection with; and
   registering, in the memory of the electronic device, the new proximity area electronic devices as belonging to the one or more proximity area electronic devices.

5. The method of claim 1, further comprising categorizing the one or more proximity area electronic devices into one or more distinct categories.

6. The method of claim 5, wherein the predetermined success set of the one or more proximity area electronic devices is based on the categorizing.

7. The method of claim 1, wherein the predetermined success set of the one or more proximity area electronic devices is based on a number of proximity area electronic devices a proximity area connection has been established with.

8. The method of claim 1, further comprising controlling the periodically activating of the electronic device by a clock in the electronic device.

9. The method of claim 8, further comprising synchronizing the clock in the electronic device and clocks of the one or more proximity area electronic devices.

10. The method of claim 1, wherein the wide area connection is a wireless connection between the electronic device and the at least one wide area electronic device relayed via an interconnecting device.

11. The method of claim 1, wherein the proximity area connection is a direct wireless connection between the electronic device and a respective proximity area electronic device.

12. An electronic device comprising:
- a controller configured to periodically activate the electronic device from a low power mode into a proximity area connectivity mode,
- while in the proximity area connectivity mode, the controller is configured to control proximity area connectivity of the electronic device with one or more proximity area electronic devices, via a wireless proximity area connection unit of the electronic device trying to establish proximity area connection with the one or more proximity area electronic devices,
- upon successful establishment of proximity area connection of the electronic device with a predetermined set of the one or more proximity area electronic devices, the controller is arranged to return the electronic device to the low power mode;
- upon unsuccessful establishment of proximity area connection of the electronic device with the predetermined set of the one or more proximity area electronic devices, the controller is arranged to transfer the electronic device from the proximity area connectivity mode into a wide area connectivity mode, while in the wide area connectivity mode, the controller is configured to, via a wireless wide area connection unit of the electronic device, connect the electronic device to at least one wide area electronic device via a wide area connection.

13. The electronic device according to claim 12, further comprising a memory comprising a register of proximity area electronic devices belonging to the one or more proximity area electronic devices.

14. The electronic device according to claim 12, further comprising a clock and wherein the controller is arranged to control the periodically activating of the electronic device by a clock signal provided by the clock.

15. A non-transitory computer-readable recording medium having recorded thereon a program for implementing the method according to claim 1 when executed on an electronic device having processing capabilities.

* * * * *